US006847374B2

(12) United States Patent
Matsuda

(10) Patent No.: US 6,847,374 B2
(45) Date of Patent: *Jan. 25, 2005

(54) ENVIRONMENT-COMPLIANT IMAGE DISPLAY SYSTEM AND PROGRAM

(75) Inventor: Hideki Matsuda, Fujimi-cho (JP)

(73) Assignee: Seiko Epson Corporation, Tokyo (JP)

( * ) Notice: Subject to any disclaimer, the term of this patent is extended or adjusted under 35 U.S.C. 154(b) by 65 days.

This patent is subject to a terminal disclaimer.

(21) Appl. No.: 09/916,678

(22) Filed: Jul. 30, 2001

(65) Prior Publication Data

US 2002/0015043 A1 Feb. 7, 2002

(30) Foreign Application Priority Data

Jul. 31, 2000 (JP) ......................................... 2000-230949

(51) Int. Cl.$^7$ ................................................. G09G 5/02
(52) U.S. Cl. ........................................... 345/589; 345/77
(58) Field of Search ................................ 345/589, 590, 345/600, 74.1, 207, 77, 89, 101, 690

(56) References Cited

U.S. PATENT DOCUMENTS

| 4,952,917 | A | | 8/1990 | Yabuuchi |
| 5,488,434 | A | | 1/1996 | Jung |
| 5,561,459 | A | | 10/1996 | Stokes et al. |
| 5,642,172 | A | * | 6/1997 | Yoon et al. ................ 348/603 |
| 5,739,809 | A | | 4/1998 | McLaughlin et al. |
| 5,760,843 | A | | 6/1998 | Morimura et al. |
| 5,952,992 | A | * | 9/1999 | Helms .......................... 345/102 |
| 5,956,004 | A | * | 9/1999 | Hush et al. ................... 345/74 |
| 6,297,859 | B1 | * | 10/2001 | George ........................ 348/747 |
| 6,480,202 | B1 | * | 11/2002 | Deguchi et al. ............ 345/600 |

FOREIGN PATENT DOCUMENTS

| EP | 0 700 218 A2 | 3/1996 |
| GB | 2 335 326 A | 9/1999 |
| GB | 2 341 033 A | 3/2000 |
| JP | 59-066280 | 4/1984 |
| JP | A-03-074969 | 3/1991 |
| JP | 04-127667 | 4/1992 |
| JP | 05-100652 | 4/1993 |
| JP | 06-178244 | 6/1994 |
| JP | 07-095558 | 4/1995 |
| JP | 09-018806 | 1/1997 |
| JP | A 09-107484 | 4/1997 |
| JP | 09-149337 | 6/1997 |
| JP | A-09-190170 | 7/1997 |
| JP | A-09-197999 | 7/1997 |
| JP | A-10-070653 | 3/1998 |
| JP | A 10-105145 | 4/1998 |
| JP | A 10-304395 | 11/1998 |
| JP | A 11-085952 | 3/1999 |
| JP | A-11-146232 | 5/1999 |
| JP | A 11-234539 | 8/1999 |
| WO | WO 94/18790 | 8/1994 |

OTHER PUBLICATIONS

New U.S. application, Matsuda, Jul. 30, 2001.

* cited by examiner

Primary Examiner—Matthew Luu
(74) Attorney, Agent, or Firm—Oliff & Berridge, PLC

(57) ABSTRACT

To provide an environment-compliant image display system and program, there is provided a color control processing update section which corrects colors by adjusting a LUT in a 3D-LUT storage section and corrects brightness by adjusting γ values in a 1D-LUT storage section, to increase an output value in at least a lower grayscale range when the environment is affected by ambient light, based on environmental information that has been obtained by a colored-light sensor.

13 Claims, 17 Drawing Sheets

ENVIRONMENT-COMPLIANT IMAGE DISPLAY SYSTEM AND PROGRAM

Japanese Patent Application No. 2000-230949, filed Jul. 31, 2000, is hereby incorporated by reference in its entirety.

BACKGROUND OF THE INVENTION

1. Field of the Invention

The present invention relates to an environment-compliant image display system and program.

2. Description of Related Art

When displaying images at a plurality of different locations (in presentations, meetings, medical treatments, the design and fashion field, business activities, education, as well as general-purpose images such as those in movies, TV, video, and games), an important part of achieving effective presentations is to make it possible to reproduce images exactly as the creator of those images intended, whatever the location.

One way of considering how to adjust the viewing of such images is management of the input-output characteristics of the device to achieve color management in the reproduction of colors. Specific methods of how to achieve this are not, however, clear.

When projecting and displaying an image with a projector and screen, in particular, it is difficult to reproduce colors in a suitable manner without considering not only ambient light but also the screen type.

Recent advances in increasing resolution of projectors have made color reproducibility important as well.

Particularly if the environment is affected by ambient light such as artificial light, a state can occur in which the chroma values of the colors are adversely affected by the brightness, making it impossible to reproduce colors appropriately.

SUMMARY OF THE INVENTION

The present invention was devised in the light of the above-described technical problem and has as an objective thereof the provision of an environment-compliant image display system and program that make it possible to reproduce suitable colors, even in an environment that is affected by ambient light.

(1) In order to solve the above described technical problem, according to one aspect of the present invention, there is provided an environment-compliant image display system which corrects an image, based on environmental information that expresses visual environment in an area in which the image is displayed, and displays the image; the image display system comprising:

correction means which corrects input-output characteristic data for display that is used by a means for displaying the image, the correction being in such a manner as to increase an output value in at least a lower grayscale range when the environment is affected by ambient light, based on the environmental information.

(2) According to another aspect of the present invention, there is provided an environment-compliant image display system which corrects an image, based on environmental information that expresses visual environment in an area in which the image is displayed, and displays the image; the image display system comprising:

a correction section which corrects input-output characteristic data for display that is used by a means for displaying the image, the correction being in such a manner as to increase an output value in at least a lower grayscale range when the environment is affected by ambient light, based on the environmental information.

(3) According to further aspect of the present invention, there is provided a program embodied on an information storage medium or in a carrier wave, the program for correcting an image, based on environmental information that expresses visual environment in an area in which the image is displayed, and displaying the image; the program implementing in a computer:

correction means for correcting input-output characteristic data for display that is used by a means for displaying the image, the correction being in such a manner as to increase an output value in at least a lower grayscale range when the environment is affected by ambient light, based on the environmental information.

These aspects of the present invention make it possible to reduce the deterioration of chroma and thus achieve suitable color reproduction, by increasing an output value in a lower grayscale range if the chroma of the image is adversely affected by ambient light.

An output value in lower grayscale range is particularly prone to deterioration in comparison with that of higher grayscale range, in other words, they are readily affected by ambient light. These aspects of the invention make it possible to reduce the effects of ambient light and achieve suitable color reproduction even if the environment is adversely affected by ambient light.

Note that the correction means of this image display system or program could also correct the input-output characteristic data for display that is used by a means for displaying the image, in such a manner that an output value within entire grayscale range is increased.

Note that "visual environment" in this case refers to factors such as ambient light (artificial light, natural light, etc.) and the object on which the image is displayed (display device, wall surface, screen, etc.).

This environmental information could be values that express color and brightness, such as xyY, or color and brightness correction amounts, such as $\Delta x \Delta y \Delta y$.

When implementing such an image display system, it is possible to do so by using means such as a projector or monitor.

(4) In this image display system and program, the correction means may correct the input-output characteristic data by performing a predetermined calculation using parameters that differ between a lower grayscale range and a grayscale range other than the lower grayscale range.

This makes it possible to achieve a suitable output value in accordance with a gray level by using different parameters for a lower grayscale range and a grayscale range other than the lower grayscale range.

In other words, an output value in a higher grayscale range would be increased too far if the same equation as used for increasing an output value in the lower grayscale range is used, and it could happen that the image will break up.

Excessive increasing of the output value can be prevented by using parameters that differ between a lower grayscale range and a grayscale range other than the lower grayscale range in accordance with the present invention, thus making it possible to reduce the likelihood of a situation such as one in which the image breaks up.

(5) In this image display system and program, the correction means may correct the input-output characteristic data by performing a predetermined calculation based on a difference between a brightness value for actual environment which is comprised within the environmental information, and a brightness value for an ideal environment.

This makes it possible to easily determine how much correction to apply to the input-output characteristic data, from the difference between the brightness value of the actual environment and the brightness value of an ideal environment (such as ΔY). This ensures that the amount of correction of the input-output characteristic data can be obtained rapidly.

Note that the actual environment in this case refers to the environment in which the image display system is used in practice, which is affected by external factors such as ambient light, and the ideal environment is hypothetical usage environment that is determined beforehand. The brightness value refers to a value that expresses brightness in units such as candela per square meter ($cd/m^2$) or lux (lx).

(6) In this image display system and program, the correction means may perform gamma correction as at least part of the correction of the input-output characteristic data.

This makes it possible to increase an output value in a lower grayscale range by lowering the gamma value, when an output value in the lower grayscale range has deteriorated because of the effects of ambient light, by way of example. This enables reduction of the effects of ambient light and suitable color reproduction, even when the environment is adversely affected by ambient light.

Note that if the gamma correction amount is Δγ in this case, the equation that is used for these calculations during gamma correction could be: Δγ=−hα(γ−γmin)/(1+|hα|).

In this case, h is an adjustment parameter (or it could be a constant), α is the environmental information for brightness correction obtained by the visual environment detection means, and γ min is the minimum value of γ used as data for conversion control. This γ min is used for adjusting the values of the above equation so as to lie within a suitable range.

This makes it possible to correct the image automatically in accordance with the visual environment, by determining the visual environment and correcting the image continuously.

(7) In this image display system and program, the correction means may correct color modification information that is stored in a predetermined storing region, in such a manner that a color temperature of the image to be displayed is adjusted, based on a brightness value for the actual environment that is comprised within the environmental information.

This makes it possible to reproduce the colors of the image suitably, by adjusting the color temperatures in accordance with the brightness of external factors such as the ambient light in practice.

(8) In this image display system and program, the color modification information may be a three-dimensional look-up table.

In them prior art, a one-dimensional look-up table (1D-LUT) is used with the objective of providing refinements such as color temperature adjustment, γ correction, and correction of the characteristics of the display elements.

To achieve high-quality color management, however, it is necessary to aim for consistency of reproducible color gamuts between other display devices having different reproducible color gamuts and a standard color space (sRGB, for example).

It is also necessary to match the reproducible color gamut of a display device that has been affected by its environment with the reproducible color gamut of other display devices or the standard color space. To achieve such matching of the reproducible color gamut, corrections called color compression and color expansion are applied.

When it comes to matching two reproducible color gamuts, some parts of one reproducible color gamut will project from the other reproducible color gamut, and other parts of the first reproducible color gamut will be within the other reproducible color gamut. For that reason, it is necessary to perform corrections that apply compression to areas of a specific color or expansion to areas of another specific color, within the same reproducible color gamut.

It is difficult to implement such color control over specific areas by using 1D-LUTs to control the gamma values of each RGB color. Even though a 1D-LUT is a mapping table, it can only control primary colors and it is difficult to apply different levels of control for each color. On the other hand, a three-dimensional look-up table (3D-LUT) makes it possible to control each color, even if they are not primary colors, which enables variable control (color compression and color expansion) for each area of color such as those described above.

The use of a 3D-LUT as color modification information makes it possible to control features such as variable color compression and color expansion for each area of color, which is difficult with a 1D-LUT, thus enabling accurate color reproduction.

The correction means could correct a gamma table that is at least part of the one-dimensional look-up table, as the gamma correction.

The image display system may comprise visual environment detection means for measuring at least one of the color value, gamma, and color temperature of an image that is displayed in the image display area.

Similarly, the environmental information in the program may be information from a visual environment detection means for measuring at least one of the color value, gamma, and color temperature of an image that is displayed in the image display area.

In this case, "color values" refers to indices that express colors by factors such as tri-stimulus values, chromaticity coordinates, spectrum distribution, excitation purity, or main wavelength.

Note that this visual environment detection means could be one or a combination of several different devices, such as a luminance sensor that measures the luminance value of the image display area, a colored-light sensor that measures the RGB values or XYZ values of the image display area, or a chromaticity sensor that measures the chromaticity values of the image display area.

In this image display system and program, the image display area could be an area on a screen.

This image display system can be applied in a satisfactory manner even when the way in which colors are seen is greatly changed by materials such as the screen.

This image display system may also comprise:
  means for displaying an image that prompts the input of the type of the screen; and
  means for inputting the thus-input type of the screen as at least part of the environmental information.

This program may implement in a computer:
  means for causing a display means to display an image that prompts the input of the type of the screen; and
  means for causing an input means to input the thus-input type of the screen as at least part of the environmental information.

This makes it possible to correct the colors and brightness of an image in a suitable manner, by determining the visual environment of the screen in a manner that cannot be considered in the prior art.

In particular, since there is only a small number of screen types and people can easily distinguish between them, there is little likelihood of a decision error during input of this screen type and thus it is possible to determine the screen type accurately.

Note that this screen could be of a reflective type or a transmission type.

In this image display system and program, the visual environment detection means may determine the visual environment with reference to the screen type.

This visual environment detection means could comprise a sensor that determines the screen characteristics, by way of example.

More specifically, the screen characteristics could be determined by using a sensor such as a colored-light sensor to measure reflected light (or transmitted light) when a white light is projected.

This makes it possible to determine the visual environment in light of the screen type, and also absorb differences in screen type by applying correction such as gamma correction or color temperature correction that is based on the result of this determination. It is thus possible to reproduce substantially the same colors, irrespective of the screen type.

With PCs or the like that use operating systems with internal prior-art color management systems, in particular, the only consideration is the type of display connected to the PC. In addition, methods of performing color correction from consideration of ambient light have been proposed, but there is nothing that considers the type of the screen that forms the area in which the image is displayed.

The present invention makes it possible to create and display images that reflect the visual environment in a suitable manner, by applying color correction after determining the visual environment with reference to the screen type.

In this image display system, the visual environment detection means may also comprise means for determining the visual environment by measuring at least ambient light.

Similarly, in the program, the visual environment detection means may determine the visual environment by measuring at least ambient light.

This makes it possible to determine the visual environment by a method such as measuring the ambient light. Ambient light within the visual environment has a huge effect on the way in which an image is seen. The visual environment can be determined in a suitable manner by measuring the ambient light which is a major factor in how an image is seen.

DETAILED DESCRIPTION OF THE EMBODIMENT

The description below relates to a case in which the present invention is applied to an image display system which uses a liquid-crystal projector and which can adapt to the environment, by way of example, with reference to the accompanying figures.

Description of Overall System

Figure 1:
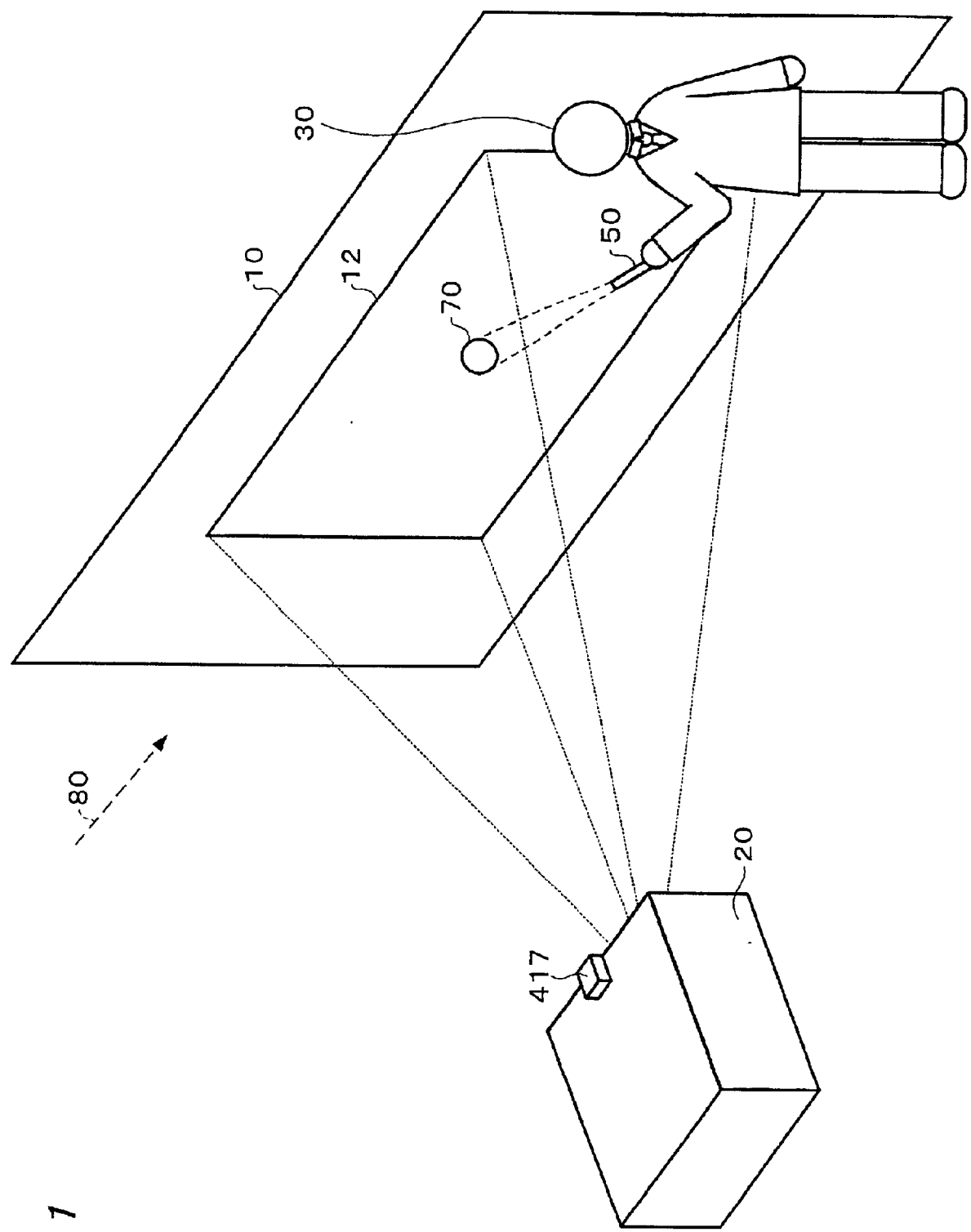
FIG. 1 is a schematic illustrative view of a presentation system that uses a laser pointer in accordance with an example of this embodiment of the present invention.

A schematic illustrative view shown in FIG. 1 is of a presentation system that makes use of a laser pointer 50, in accordance with an example of this embodiment of the present invention.

A projector 20 that is provided substantially facing a screen 10 projects an image for a predetermined presentation. A presenter 30 gives a presentation to an audience, while using a light spot 70 projected from the laser pointer 50 to point at a desired position of an image in an image display region 12, which is an image display area on the screen.

During such a presentation, the way in which images on the image display region 12 are seen will vary greatly, depending on factors such as the type of the screen 10 and ambient light 80. When the same white is displayed, for example, it could seem to be white with a yellow cast or white with a blue cast, depending on the type of the screen 10. Even when the same white is displayed, it could seem to be a bright white or a dull white if the ambient light 80 differs.

Recently, the projector 20 has become smaller and easy to transport. For that reason, it has become possible to perform presentations at a client's location, by way of example, but it is difficult to adjust colors to match the environment at the client's location and the manual adjustment of colors at the client's location takes too much time.

Figure 2:
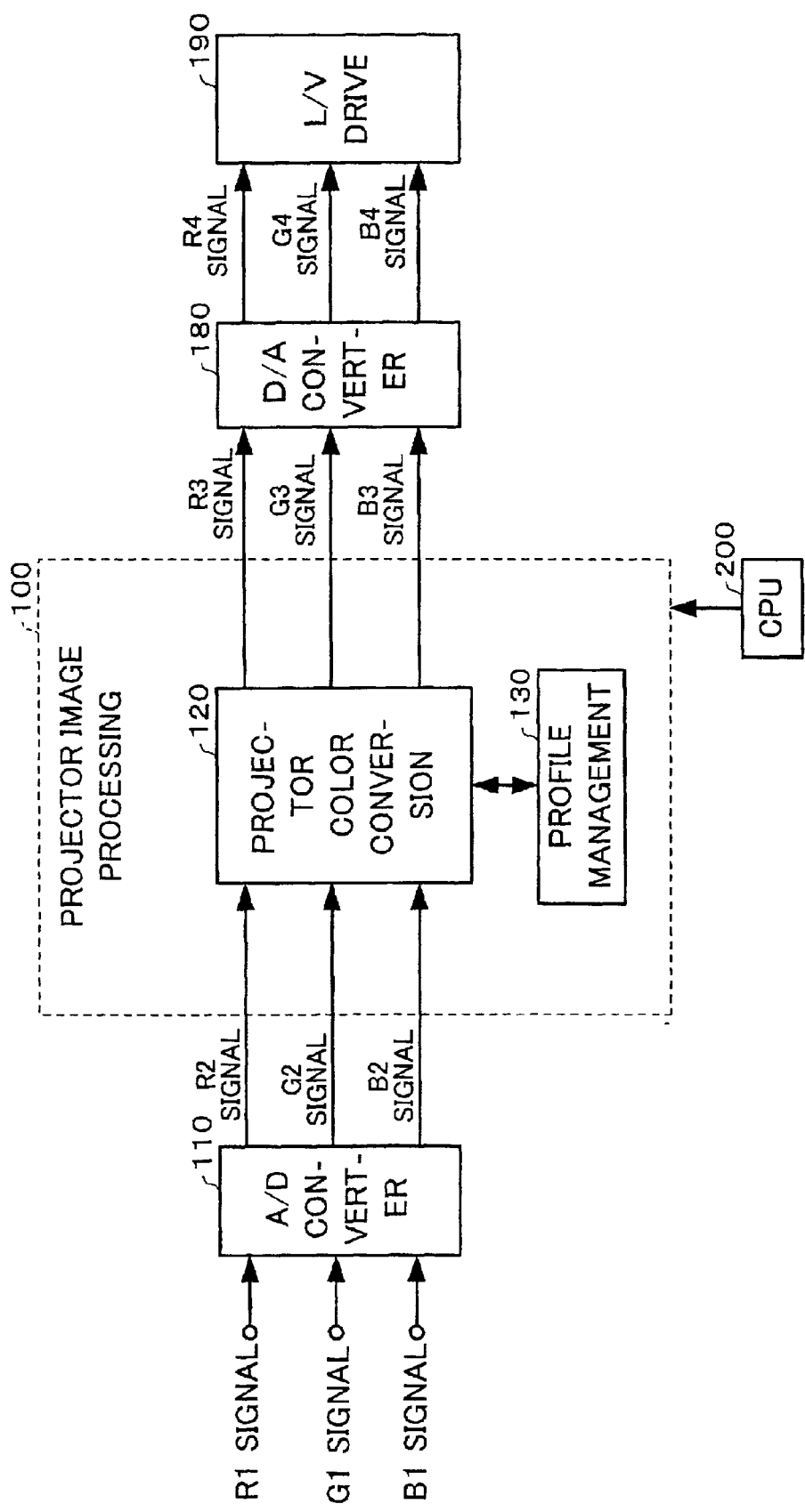
FIG. 2 is a functional block diagram of the image processing section within a prior-art projector.

A functional block diagram of the image processing section within a prior-art projector is shown in FIG. 2.

This prior-art projector inputs an R1 signal, a G1 signal, and a B1 signal (which for RGB signals in analog format, sent from a PC or the like) to an A/D converter section 110, and uses a projector image processing section 100 to perform color modification on an R2 signal, a G2 signal, and a B2 signal which have been converted into digital form by the A/D converter section 110.

A D/A converter section 180 converts an R3 signal, a G3 signal, and a B3 signal, which have been subjected to the color modification of the projector image processing section 100, into analog form and outputs them as an R4 signal, a G4 signal, and a B4 signal. A light valve (L/V) drive section 190 drives liquid-crystal light bulbs to display an image, based on the R4 signal G4 signal, and B4 signal.

The projector image processing section 100, which is controlled by a CPU 200, comprises a projector color conversion section 120 and a profile management section 130.

The projector color conversion section 120 converts the RGB digital signals (the R2 signal, G2 signal, and B2 signal) into RGB digital signals for projector output (the R3 signal, G3 signal, and B3 signal), based on a projector input-output profile that is managed by the profile management section 130. Note that "profile" in this case refers to characteristic data.

In this manner, the prior-art projector can only perform color modification based on an input-output profile that indicates input-output characteristics that are specific to that particular projector, so no consideration is paid to the visual environment in which the image is projected and displayed.

However, it is difficult to make the way in which colors are seen uniform in this manner, without taking the visual environment into account. The way in which colors are seen is determined by three factors: light, the reflection or transmission of light by objects, and vision.

This embodiment of the present invention implements an image display system that can reproduce an image with the same visual appearance, by determining the visual environment of light and the reflection or transmission of light by objects, irrespective of the environment in which it is applied.

More specifically, the device is provided with a colored-light sensor 417 that functions as visual environment detection means for determining the visual environment, as shown in FIG. 1, and environmental information from the colored-light sensor 417 is input to the projector 20. To be more specific, the colored-light sensor 417 measures colored-light information (more specifically, information indicating xyY colors and brightness) of the image display region 12 within the screen 10.

The projector 20 is provided with color control processing means having a storage area for storing color correction information and brightness correction information that is one type of input-output characteristic data for display that is used by a means for displaying an image, and correction means for correcting the color correction information and brightness correction information, based on environmental information from the colored-light sensor 417.

The description now turns to the function blocks of the image processing section of the projector 20, which comprises this color control processing means and this correction means.

Figure 3:
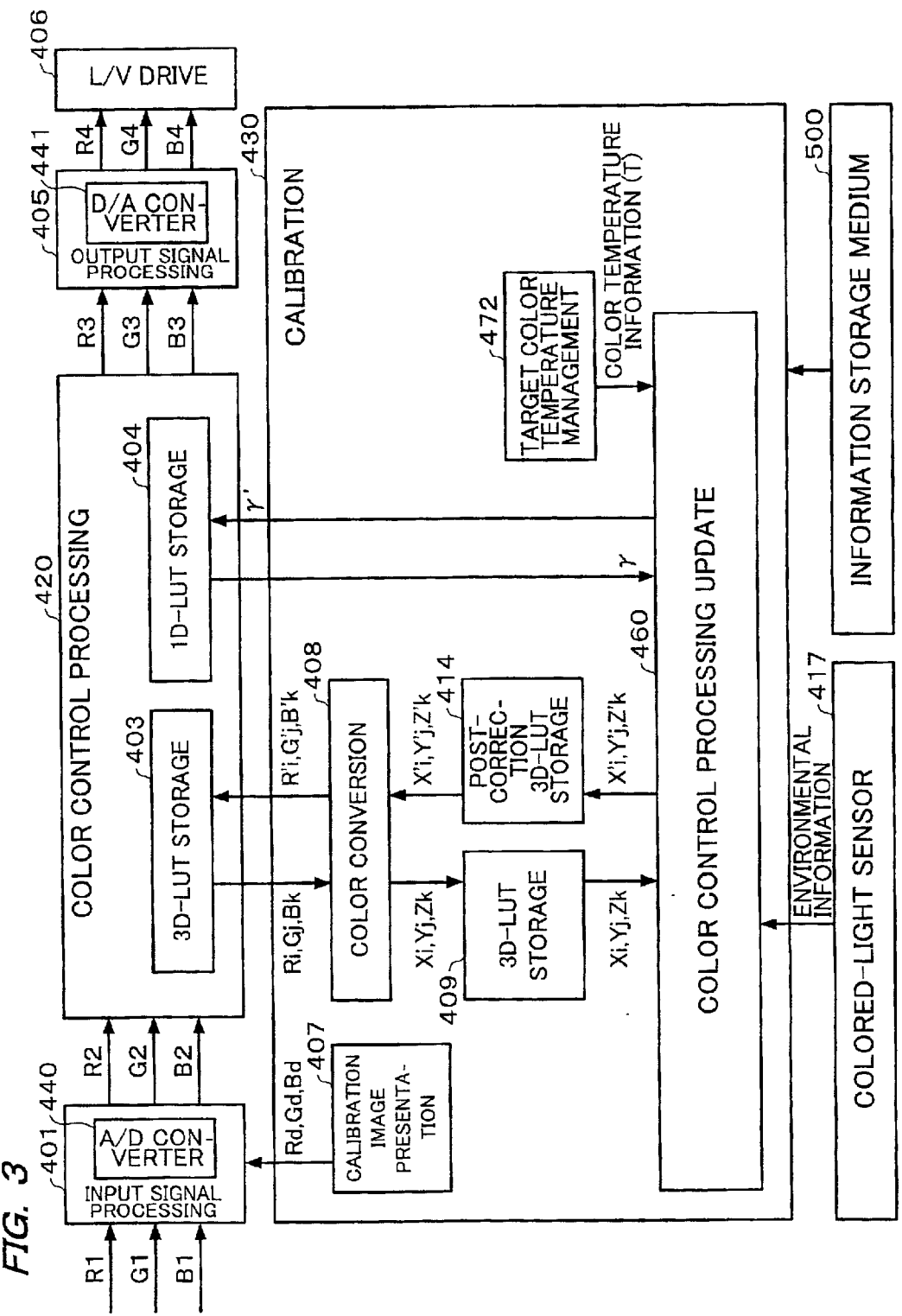
FIG. 3 is a functional block diagram of the image processing section within a projector in accordance with an example of this embodiment of the present invention.

A functional block diagram of the image processing section within the projector 20 in accordance with an example of this embodiment of the invention is shown in FIG. 3.

The image processing section comprises an input signal processing section 401 to which RGB signals are input, a color control processing section 420, a calibration section 430 that functions as correction means, an output signal processing section 405, and an L/V drive section 406.

The input signal processing section 401 comprises an A/D converter section 440 that converts the R1, G1, and B1 analog image signals into the R2, G2, and B2 digital image signals.

The color control processing section 420 comprises a three-dimensional look-up table (3D-LUT) storage section 403 that is used in correcting the color information and a 1D-LUT storage section 404 that is used in correcting the brightness information.

Note that a gamma table and color balance table (or just one of them) are stored as part of the brightness correction information in the 1D-LUT storage section 404. Similarly, a color-gamut correction table and a color temperature correction table (or just one of them) are stored as part of the color correction information in the 3D-LUT storage section 403.

With a prior-art projector, color control is done with a 1D-LUT and brightness correction is done by determining what potential is used when sampling the input signal.

During the correction of the brightness of colors to be reproduced, it is necessary to increase an output value in a lower grayscale range. In this case, the projector 20 of this embodiment of the present invention performs brightness correction by using a 1D-LUT that can manipulate a grayscale characteristic.

As previously described, the projector 20 of this embodiment of the invention performs color correction by using a 3D-LUT, to ensure appropriate color compression or color expansion for each color when it comes to matching other reproducible color gamuts by color control.

In this manner, brightness and color can be corrected separately, based on environmental information relating to brightness and environmental information relating to color, making it possible to perform each type of correction more precisely.

With this embodiment of the present invention, the values of a gamma correction table within the 1D-LUT storage section 404 are corrected to increase the output for the entire grayscale range when the environment is affected by ambient light, to suppress deterioration of the chroma values of the colors. This makes it possible to reproduce colors in substantially the same manner as that when the environment is not affected by ambient light. Since a lower grayscale range is particularly likely to be affected by ambient light, in comparison with a higher grayscale range, it is possible to reproduce colors in substantially the same manner as that when the environment is not affected by ambient light, by performing γ correction in such a manner as to increase an output value in at least the lower grayscale range.

The description now turns to color correction, which will be followed by a description of brightness correction.

Color Correction

The calibration section 430 comprises a calibration image presentation section 407 which inputs image signals for calibration (correction) to the input signal processing section 401, a color conversion section 408 which converts colors for conversion (stored in the 3D-LUT storage section 403) from the RGB color system into the XYZ color system, and a color control processing update section 460 which performs color and brightness correction, based on environmental information that is input from the colored-light sensor 417.

Note that the RGB system results in device-dependent colors that vary with the input-output device, such as a projector, but the XYZ system results in non-device-dependent colors.

The color conversion section 408 takes the color information that is stored in RGB format (Ri, Gj, and Bk, where i, j, and k are integers in this document) in the 3D-LUT storage section 403 and converts it into color information (Xi, Yj, Zk). In other words, the color information is managed in a plurality of grayscales.

The color conversion section 408 temporarily stores that color information (Xi, Yj, Zk) in a 3D-LUT storage section 409 and outputs it to the color control processing update section 460.

The color control processing update section 460 converts the color information (Xi, Yj, Zk) stored in the 3D-LUT storage section 409, based on environmental information from the colored-light sensor 417.

The colored-light sensor 417 functions as a visual environment detection means that determines the visual environment. The colored-light sensor 417 could be one or a combination of several different devices, such as a luminance sensor that measures the luminance value of the image display area, a colored-light sensor that measures the RGB values or XYZ values of the image display area, or a chromaticity sensor that measures the chromaticity values of the image display area.

This environmental information is environmental information for color correction and environmental information for brightness correction.

In this case, the environmental information for color correction could be information such as white-light chromaticity of the illumination, chromaticity correction request information (such as a color difference or chromaticity difference), color phase, color temperature change request information, or the correlated color temperature of the illumination, by way of example.

Similarly, the environmental information for brightness correction could be brightness (luminance) of the illumination, image signal brightness correction request information (such as ΔY), image output adjustment information, image contrast, or contrast correction request information, by way of example.

Note that information that combines environmental information for color correction and environmental information for brightness correction (in a form such as xyY) could also be used as the environmental information.

The calibration section 430 comprises a target color temperature management section 472 for managing the color temperature of the reproduced image.

The target color temperature management section 472 outputs color temperature information (T) to the color control processing update section 460. More specifically, the color temperature information (T) in this case is information such as a target color temperature, a target correlated color temperature, the chromaticity of the target color temperature, or the chromaticity of the target correlated color temperature.

If there are adverse effects such as those of artificial light, it is difficult to accurately reproduce a color temperature to act as a target, such as a target color temperature. In this case, the color control processing update section 460 obtains the color information (X'i, Y'j, Z'k), based on the environmental information, in such a manner that an image of the color temperature T can be reproduced in a state that is affected by factors such as the artificial light in practice, by outputting an image so as to form the color temperature T' from consideration of effects such as those of artificial light.

The color control processing update section 460 outputs the thus-obtained tri-stimulus values (X'1, Y'1, Z'1) to a post-correction 3D-LUT storage section 414.

The color conversion section 408 converts the (X'1, Y'1, Z'1) values in the post-correction 3D-LUT storage section 414 into (R'1, G'1, B'1) values, then outputs the converted (R'1, G'1, B'1) values to the 3D-LUT storage section 403.

In this manner, it is possible to reproduce colors to suit the visual environment, by overwriting the colors of the 3D-LUT in the 3D-LUT storage section 403, based on the visual environment.

In this manner, it is possible to reproduce colors to suit the visual environment, by overwriting the colors of the 3D-LUT in the 3D-LUT storage section 403, based on the visual environment.

Brightness Correction

The description now turns to brightness correction.

This brightness correction is done by the color control processing update section 460 correcting the γ values in the 1D-LUT stored in 1D-LUT storage section 404.

More specifically, the color control processing update section 460 uses the following equations to obtain the amount of correction Δγ for γ and γ' after correction:

$$\Delta\gamma = -h\alpha(\gamma - \gamma\min)/(1 + |h\alpha|) \quad \gamma' = \gamma + \Delta\gamma$$

Note that in this case, h is an adjustment parameter (or it could be a constant), α is the previously described environmental information for brightness correction, and γ min is the minimum value of γ used as data for conversion control.

This γ min is used for adjusting the values of the above equations so as to lie within a suitable range.

The description now turns to a specific example of obtaining Δγ.

Figure 5:
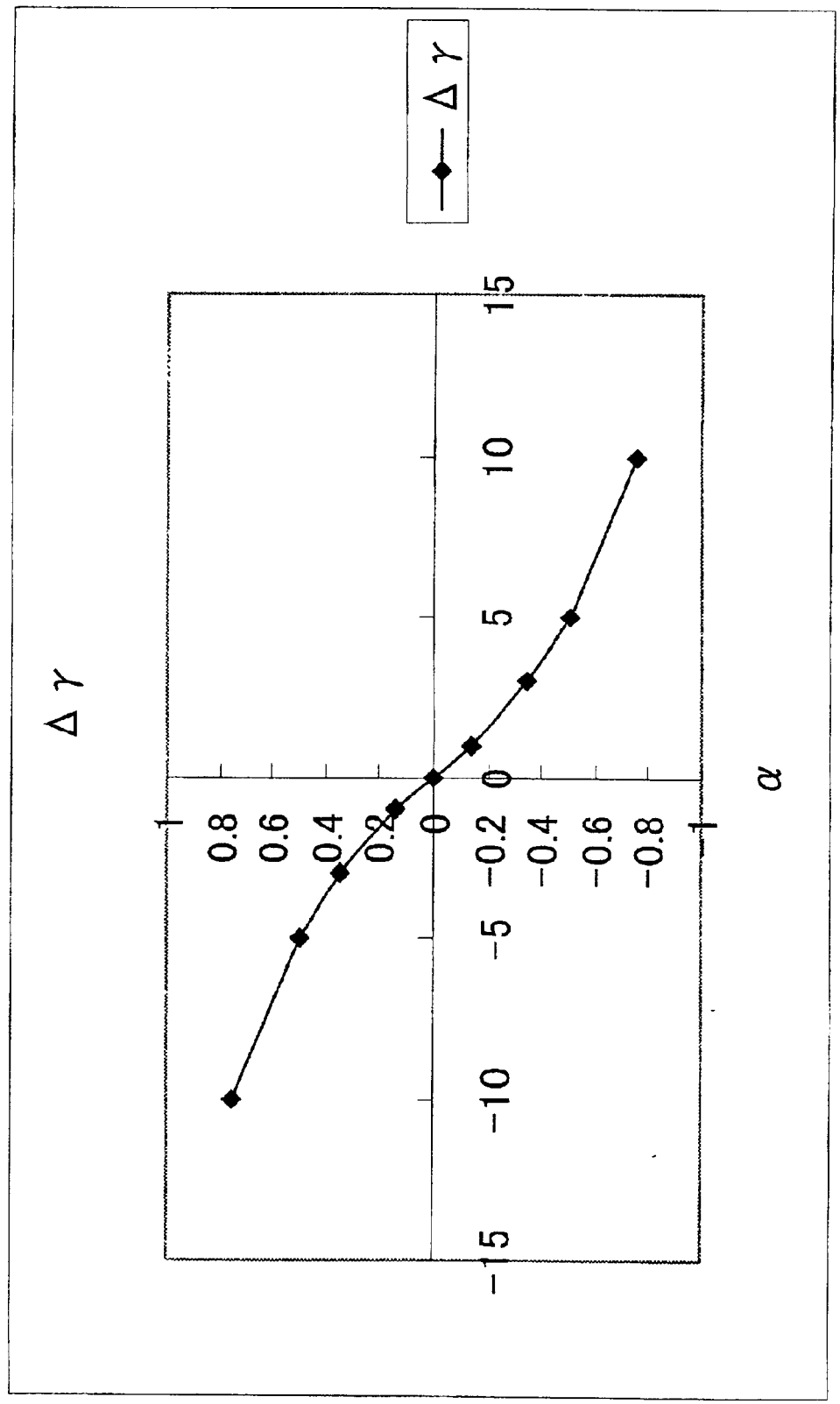
FIG. 5 shows the variation of $\Delta\gamma$ with respect to $\alpha$ in accordance with an example of this embodiment of the invention.
Figure 6:
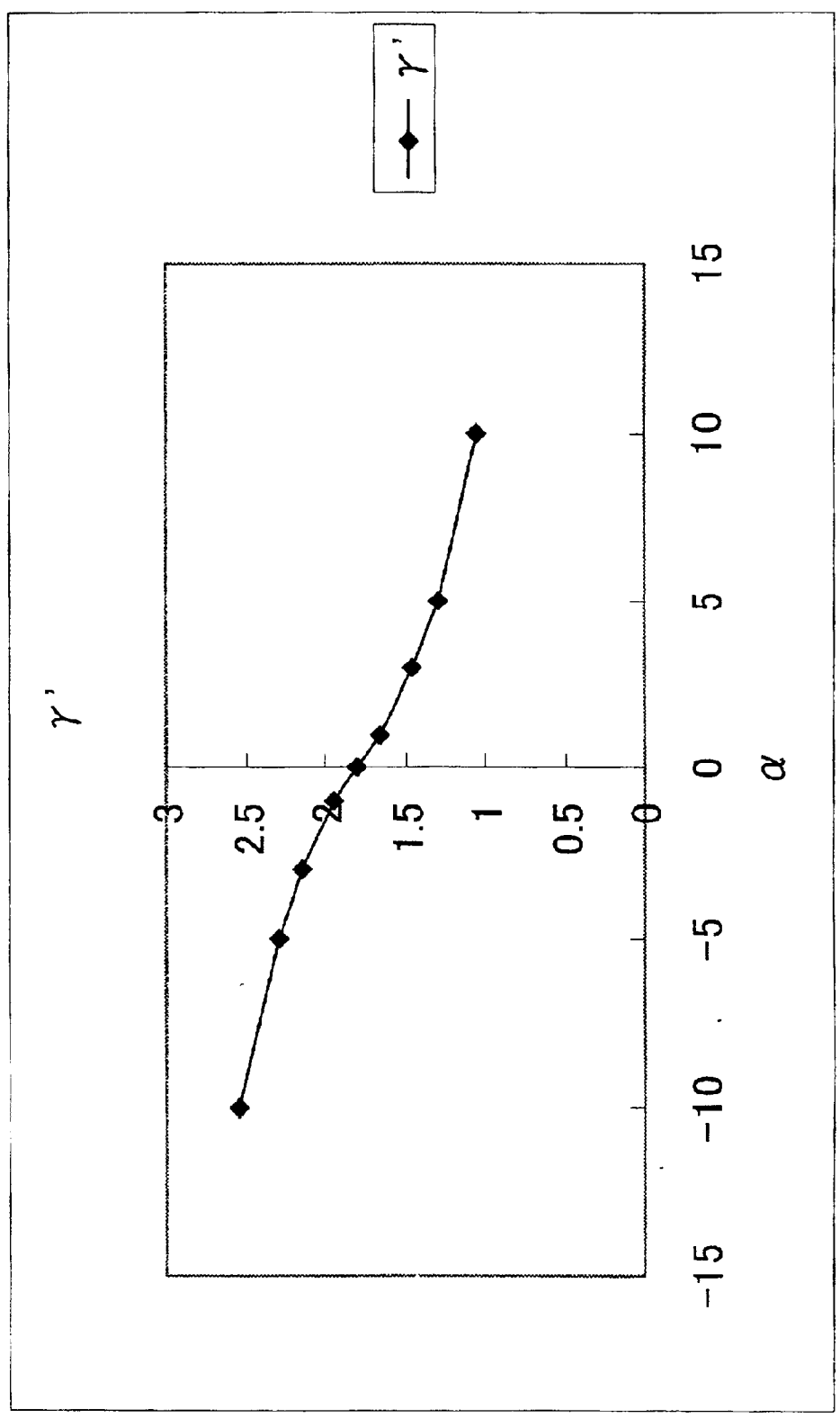
FIG. 6 shows the variation of $\gamma'$ with respect to $\alpha$ in accordance with an example of this embodiment of the invention.

The variation in Δγ with respect to α in accordance with this example of the present invention is shown in FIG. 5. Similarly, the variation in γ' with respect to α in accordance with this example of the present invention is shown in FIG. 6.

In this case, the description concerns a default γ of 1.8, γ min is 0.3, and h is 0.1.

It is assumed in this case that when the value of the environmental information for brightness correction α is 10, in other words, when the brightness is greater than that of the visual environment, the value of Δγ is −0.75 and the value of γ' is 1.05. That is to say, when the visual environment is bright because of the effects of artificial light or the like, the value of γ falls.

If the value of the environmental information for brightness correction α is −10, in other words, if it is darker than the standard visual environment the value of Δγ is 0.75 and the value of γ' is 2.55. That is to say, when the visual environment is dark because of the effects or artificial light or the like, the value of γ rises.

Figure 7:
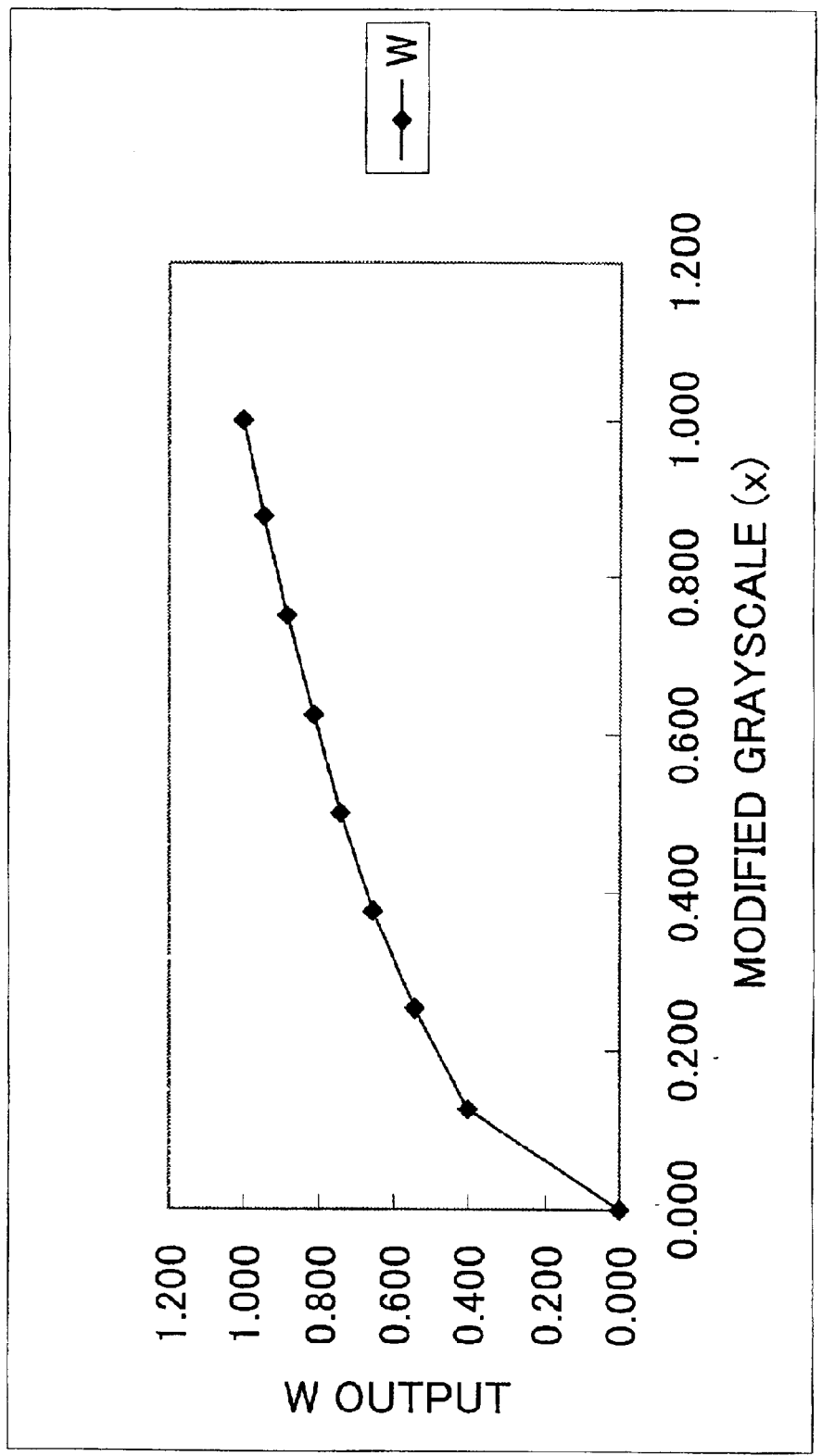
FIG. 7 shows variations in an output value with respect to the modified grayscale x after $\gamma$ correction.

The variation of the output with respect to the modified grayscale x after γ correction is shown in FIG. 7.

FIG. 7 shows the variation in output of white light (W) when the value of α 10 is 10, with the conditions shown in FIGS. 5 and 6.

As can be seen from FIG. 7, an output value in a lower grayscale range (such as 0.00 to 0.20) is relatively large in comparison with outputs in medium and higher grayscale ranges (such as 0.30 to 1.00).

This makes it possible to depict an image in which output is greater in the lower grayscale range, making it possible to reduce the effects of artificial light which affects the lower grayscale range in particular.

Note that the situation is similar for the RGB primary color signals; not just for white light (W).

The effects of artificial light in the lower grayscale range can be corrected if the γ value is small, but if the output in the higher grayscale range is too high, the contrast is reduced and thus it can happen that the image will appear to break up.

If the γ' values for a lower grayscale range and a grayscale range other than a lower grayscale range are made different in such a case, the projector 20 will be able to reproduce colors suitably in the lower grayscale range as well as in the grayscale range other than the lower grayscale range.

Figure 8:
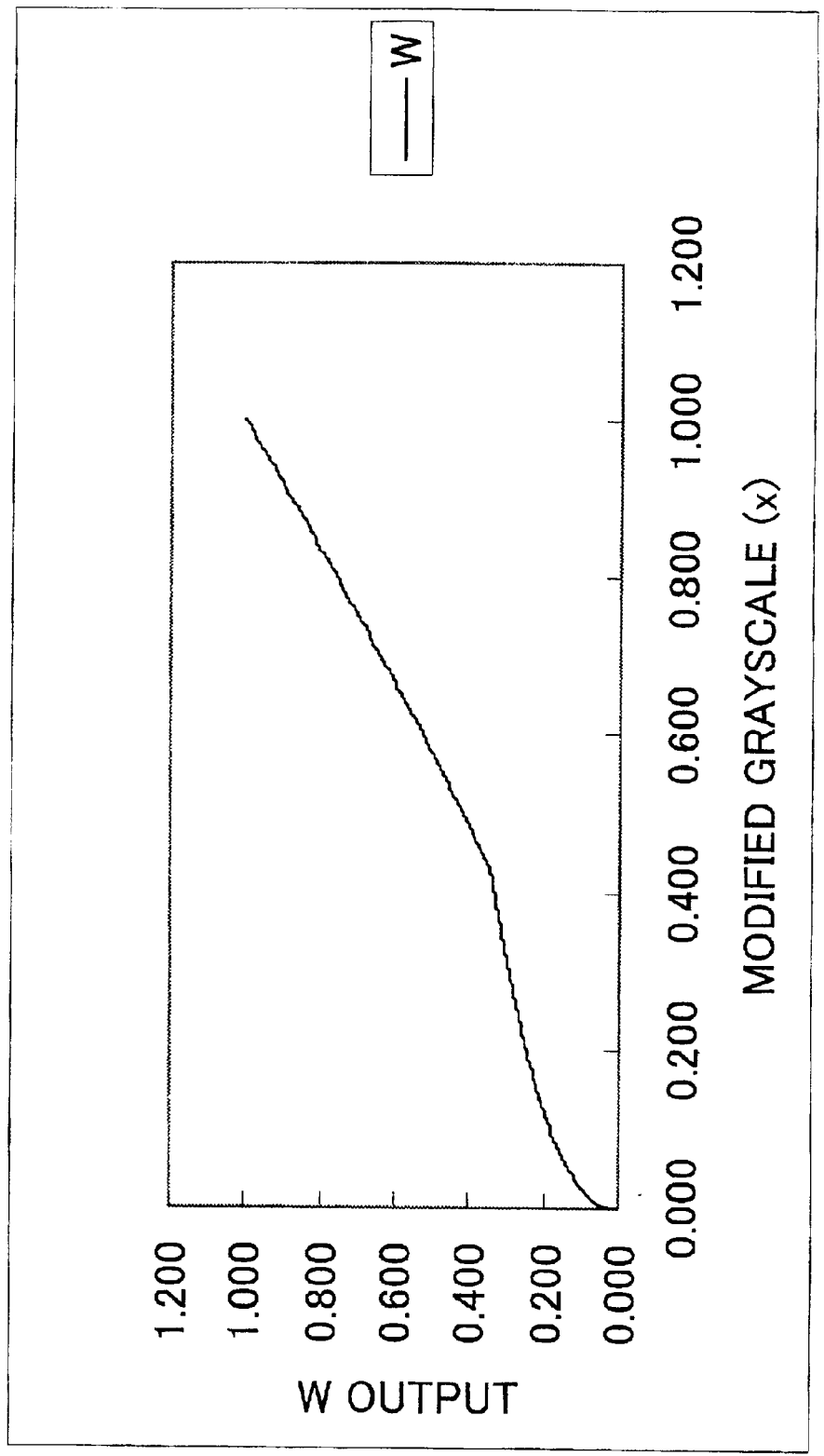
FIG. 8 shows variations in an output value when the values of $\gamma'$ are made to be different for a lower grayscale range and a grayscale range other than the lower grayscale range, in accordance with an example of this embodiment of the invention.

The graph of FIG. 8 shows variations in output when the values of γ' are made to be different for a lower grayscale range and a grayscale range other than a lower grayscale range, in accordance with an example of this embodiment of the invention. Similarly, the graph of FIG. 9 shows variations in output for a lower grayscale range and variations in output for a grayscale range other than a lower grayscale range, in accordance with an example of this embodiment of the invention.

Figure 9:
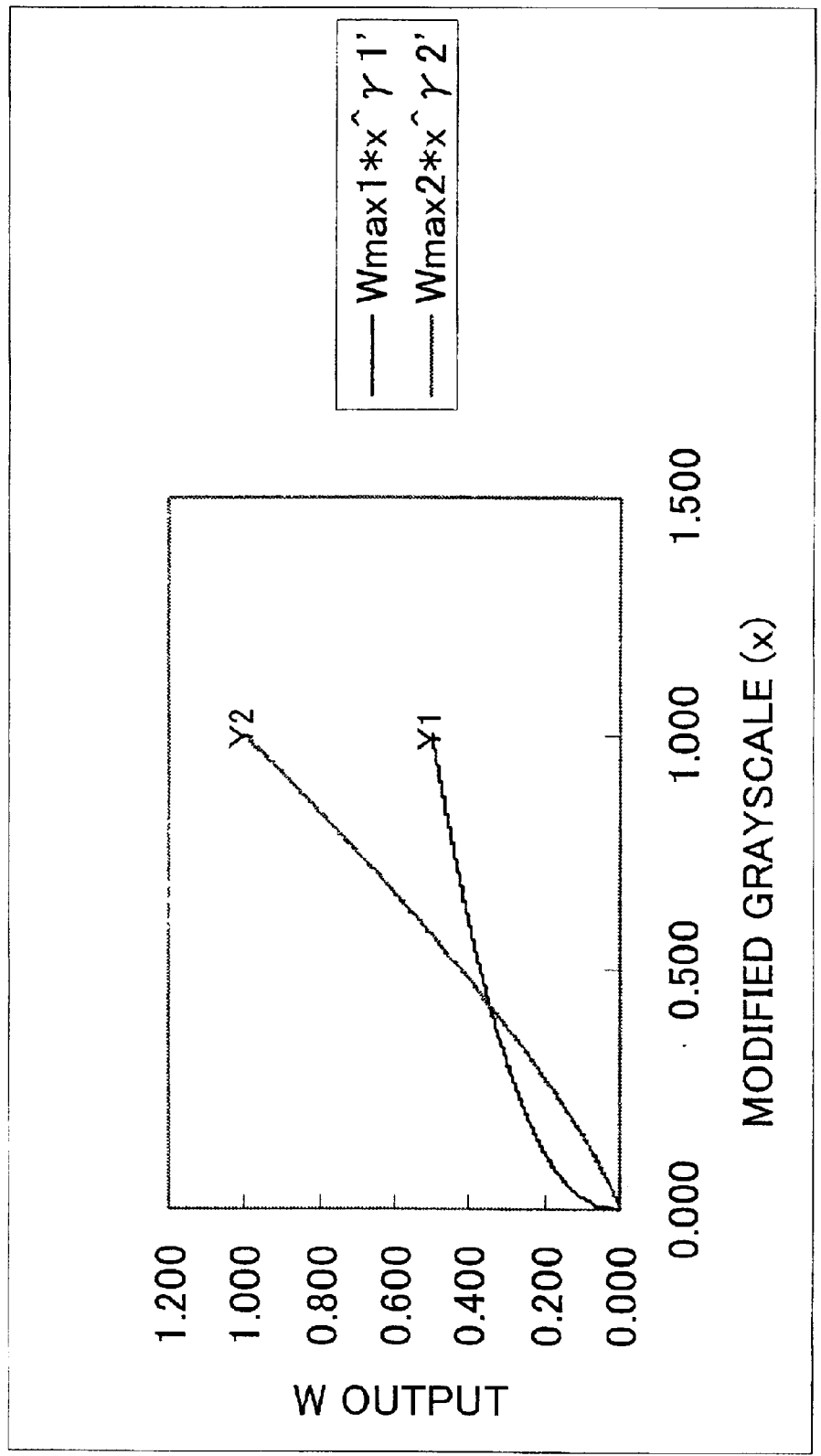
FIG. 9 shows variations in output for a lower grayscale range and variations in output for a grayscale range other than a lower grayscale range, in accordance with an example of this embodiment of the invention.

The output for the lower grayscale range is obtained from $Y1=Wmax1*x^{\gamma1'}$ and the output for the grayscale range other than the lower grayscale range is obtained by $Y2=Wmax2*x^{\gamma2'}$, as shown by way of example in FIG. 9. Note that the "^" symbol in this case means "raise to the power of".

In this graph, γ1' is the γ value after correction for the lower grayscale range and γ2' is the γ value after correction for the grayscale range other than the lower grayscale range. As can be seen from FIG. 9, the values are set as described below to ensure that Y1 is greater than Y2 in the lower grayscale range but less than Y2 in the higher grayscale range.

Assume that γmin1 for the lower grayscale range is 0.3 and γmin2 for the grayscale range other than the lower grayscale range is 1.2, by way of example, and the other values are α=10, h=1, and the default γ=1.8, in the same manner as described previously.

In such a case, calculations are performed using the equation for obtaining γ', as described previously, to obtain:

γ'1 (for the lower grayscale range)=0.44

γ'2 (for the grayscale range other than the lower grayscale range)= 1.25

The graph of Y1 and Y2 shown in FIG. 9 can be drawn by setting the values Wmax1=0.5 and Wmax2=1.0, by way of example.

The graph of FIG. 8 can be drawn by using Y1 for lower grayscale range and Y2 for grayscale range other than the lower grayscale range.

In this manner, the projector 20 can reduce break-up of the image in the higher grayscale range and thus reproduce a more suitable image, by adjusting the parameters for the lower grayscale range and the grayscale range other than the lower grayscale range.

The color control processing update section 460 updates the γ values of the 1D-LUT stored in the 1D-LUT storage section 404 with the thus-obtained γ' values.

This ensures that the projector 20 can reproduce brightness in a manner that is suitable for the visual environment, by overwriting the 1D-LUT of the 1D-LUT storage section 404, based on the visual environment.

The color control processing section 420 outputs to the output signal processing section 405 the image signals (R3, G3, and B3) that have been adjusted using the look-up tables (LUTs) in the 1D-LUT storage section 404 for brightness correction and the 3D-LUT storage section 403 for color correction.

The output signal processing section 405 uses a D/A converter section 441 to convert the digital image signals (R5, G5, and B5) into analog image signals (R6, G6, and B6), then outputs the converted analog image signals to the L/V drive section 406.

The L/V drive section 406 uses those analog image signals to drive liquid-crystal light bulbs to regulate the image projected from the projector 20.

In this above described manner, the way in which the image is seen in the image display region 12 of the screen 10 can be adjusted as appropriate by adjusting the image projected by the projector 20.

This embodiment of the present invention therefore ensures that the visual environment is considered when an image is projected and displayed.

This makes it possible to absorb differences between display environments and thus display the same image regardless of the environment to which it is applied. It is therefore possible to reproduce substantially the same colors in a plurality of different locations, within a short time.

With color and brightness correction that reflects the effects of the visual environment, the visual environment is continuously determined by the colored-light sensor 417 and the corrected color information and γ values are continuously obtained by the color control processing update section 460. This embodiment of the present invention therefore makes it possible for the projector 20 to correct the image automatically from consideration of the visual environment.

This makes it possible to adjust the image accurately within a shorter time than that required when the way in which the image is seen is adjusted manually.

The projector 20 can also increase an output value in lower grayscale range and correct the brightness of the reproduced colors by using a 1D-LUT that enables manipulation of the grayscale characteristic during the brightness correction.

The projector 20 can also apply color compression and color expansion independently for each color, by using a 3D-LUT for the color correction.

In this manner, it is possible to apply brightness correction and color correction separately, based on environmental information relating to brightness and environmental information relating to color, thus enabling it to apply both types of correction more precisely.

Specific Discussion of Effects

The description now turns to specific details of the effects of brightness and color correction, using experimental results obtained by the present inventors.

Figure 10:
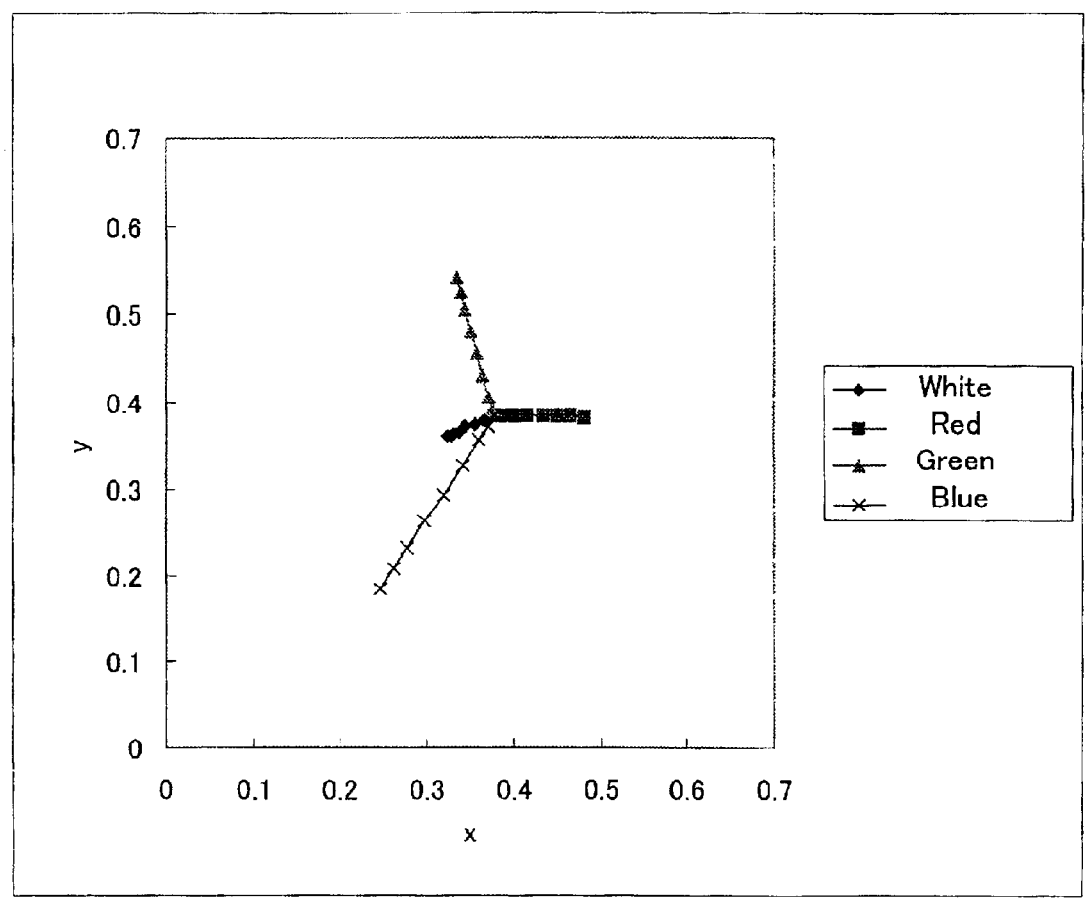
FIG. 10 shows variations in WRGB chromaticity when gray level is varied, expressed as an xy chromaticity diagram where the illuminance is approximately 600 lx and the $\gamma$ value of the projected image is 2.0.
Figure 11:
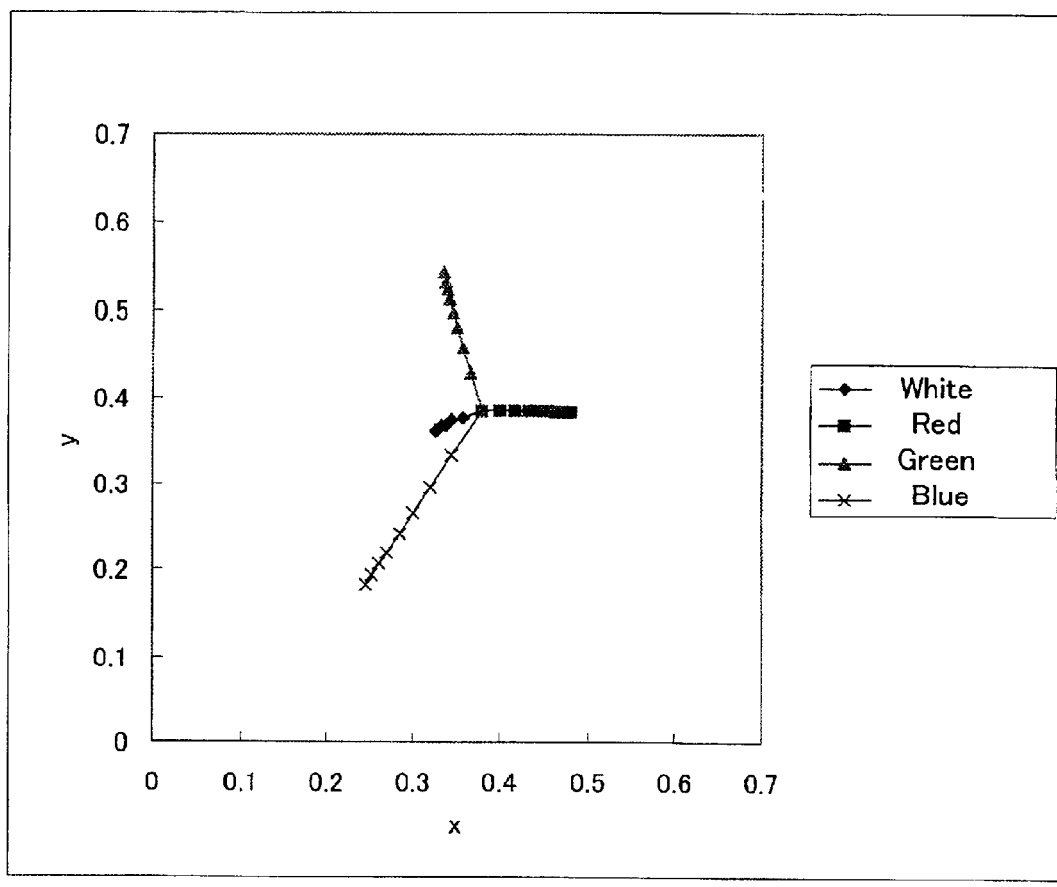
FIG. 11 shows variations in WRGB chromaticity when gray level is varied, expressed as an xy chromaticity diagram where the illuminance is approximately 600 lx and the $\gamma$ value of the projected image is 1.0.
Figure 12:
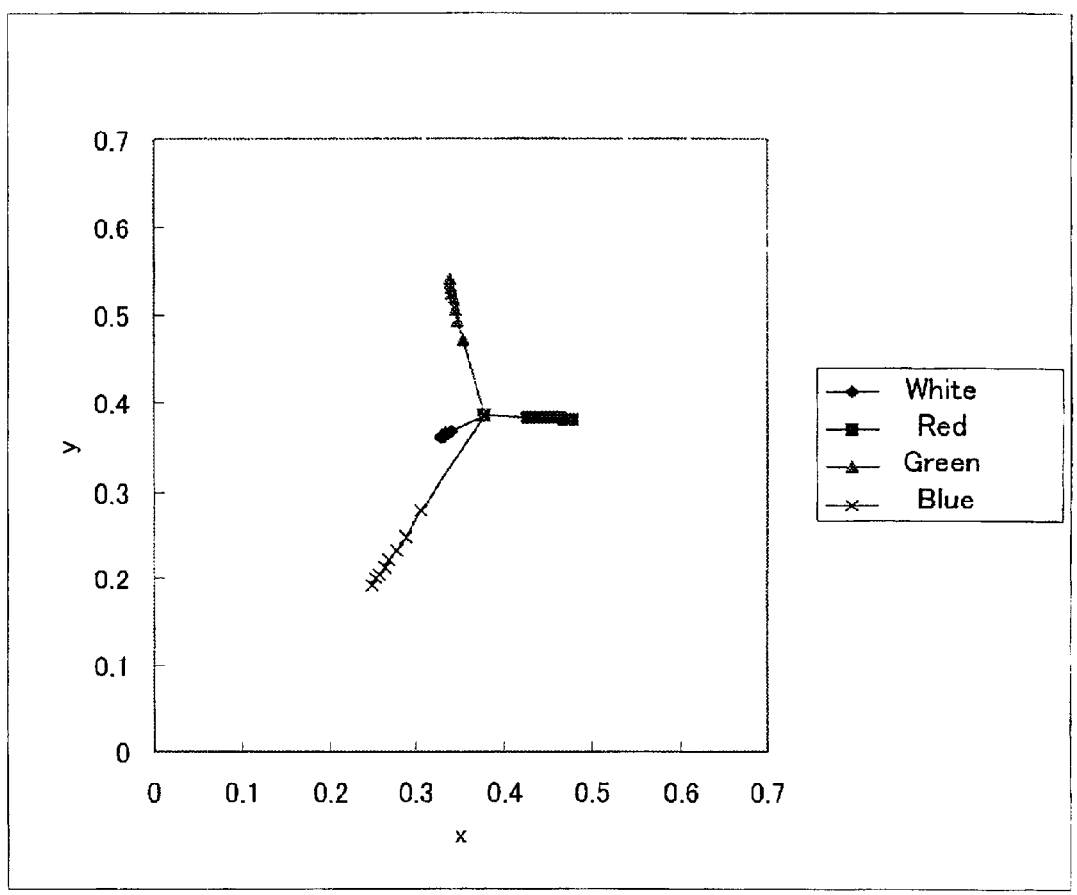
FIG. 12 shows variations in WRGB chromaticity when gray level is varied, expressed as an xy chromaticity diagram where the illuminance is approximately 600 lx and the $\gamma$ value of the projected image is 0.5.

The graph of FIG. 10 shows variations in WRGB chromaticity when gray level is varied, expressed as an xy chromaticity diagram where the illuminance is approximately 600 lux (lx) and the γ value of the projected image is 2.0, the graph of FIG. 11 shows those variations when the illuminance is approximately 600 lx and the γ value of the projected image is 1.0, and the graph of FIG. 12 shows those variations when the illuminance is approximately 600 lx and the γ value of the projected image is 0.5.

Figure 13:
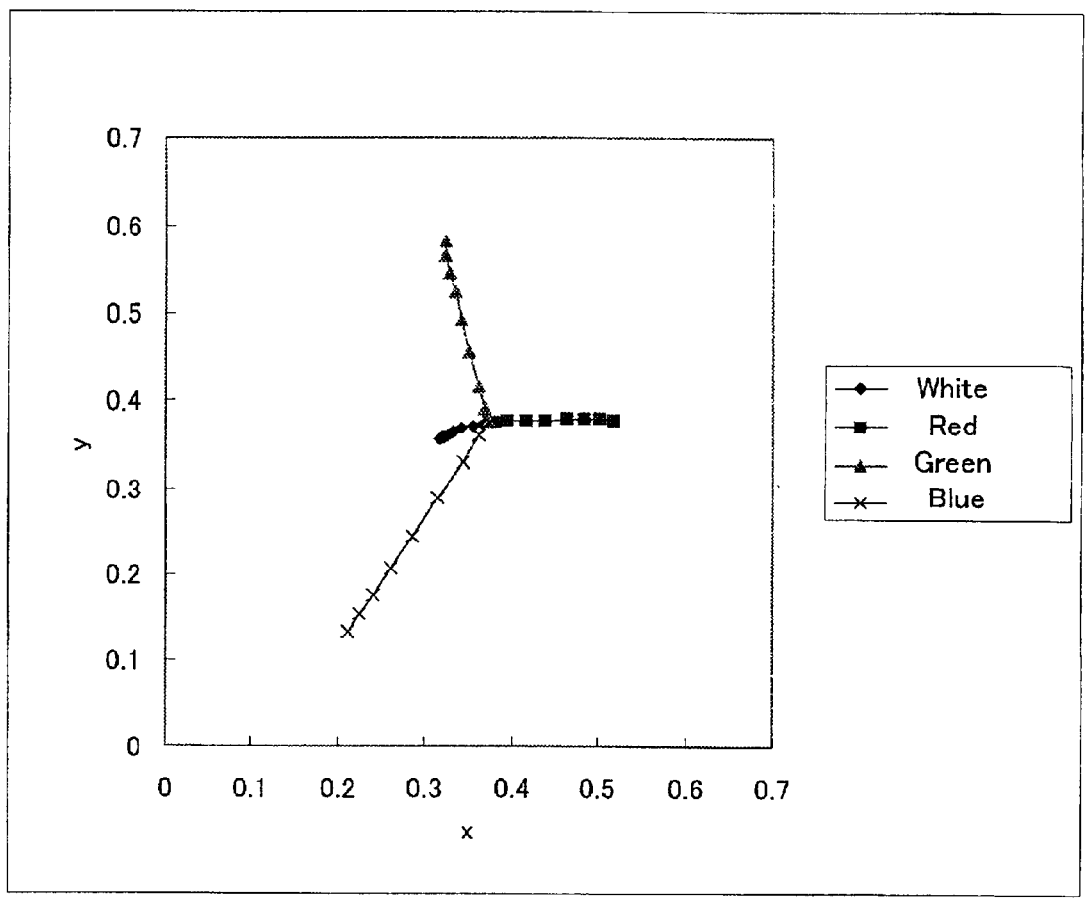
FIG. 13 shows variations in WRGB chromaticity when gray level is varied, expressed as an xy chromaticity diagram where the illuminance is approximately 300 lx and the $\gamma$ value of the projected image is 2.0.
Figure 14:
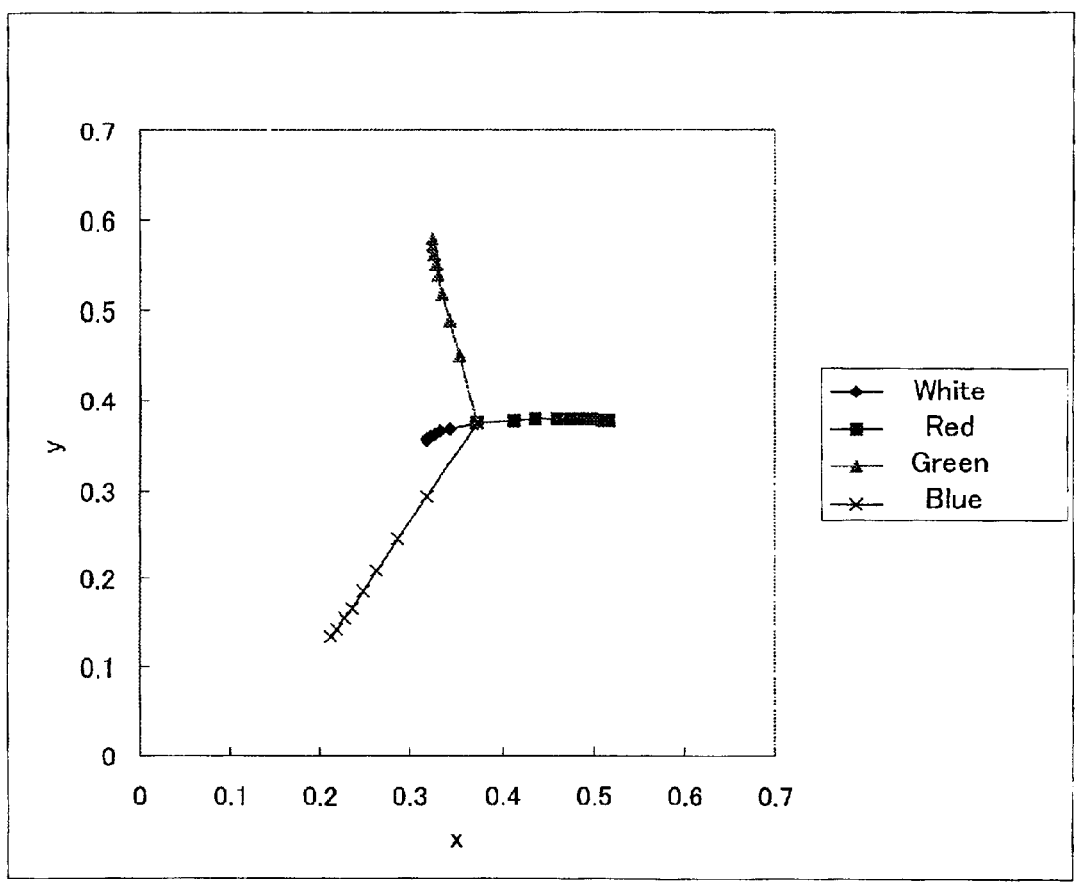
FIG. 14 shows variations in WRGB chromaticity when gray level is varied, expressed as an xy chromaticity diagram where the illuminance is approximately 300 lx and the $\gamma$ value of the projected image is 1.0.
Figure 15:
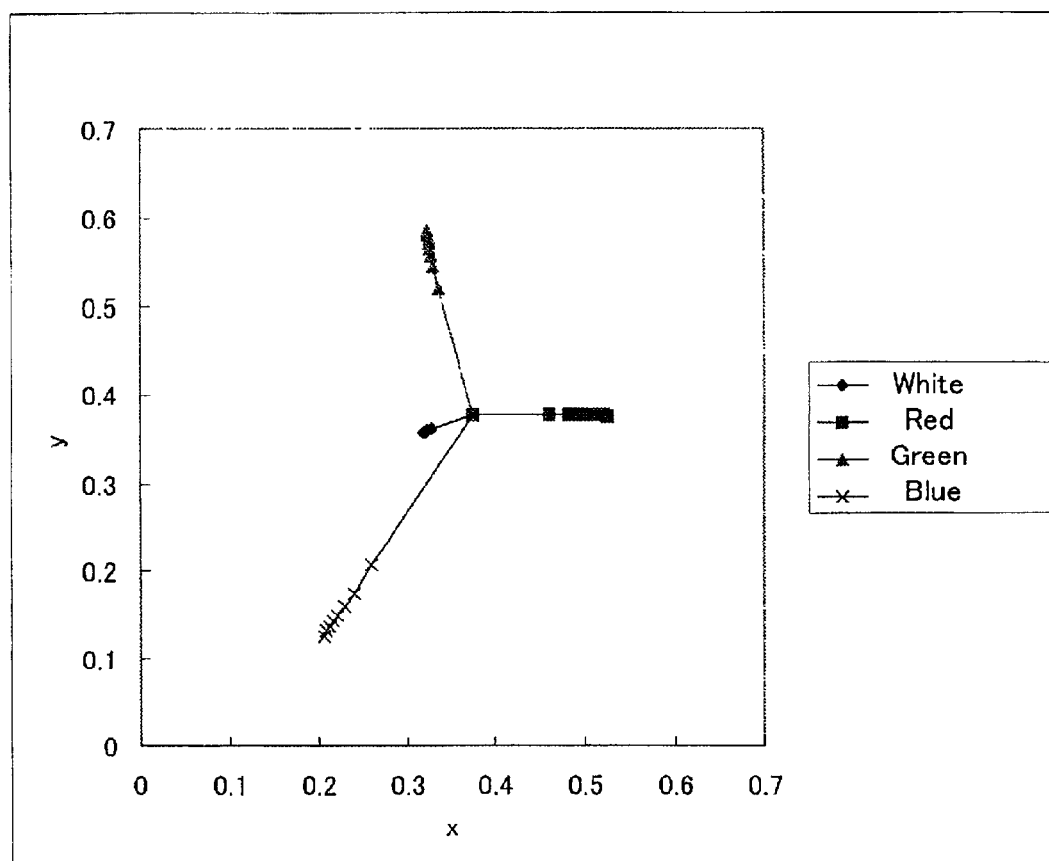
FIG. 15 shows variations in WRGB chromaticity when gray level is varied, expressed as an xy chromaticity diagram where the illuminance is approximately 300 lx and the $\gamma$ value of the projected image is 0.5.

Similarly, the graph of FIG. 13 shows variations in WRGB chromaticity when gray level is varied, expressed as an xy chromaticity diagram where the illuminance is approximately 400 lx and the γ value of the projected image is 2.0, the graph of FIG. 14 shows those variations when the illuminance is approximately 300 lx and the γ value of the projected image is 1.0, and the graph of FIG. 15 shows those variations when the illuminance is approximately 300 lx and the γ value of the projected image is 0.5.

The WRGB chromaticity is positioned further outward as the gray level increases and approaches a point as the gray level decreases. The location of the point of approach is a white or gray area in the xy chromaticity diagram where the excitation purity (chroma) is low.

Under illumination, the projection light of the projector 20 and the artificial light are subjected to additive color mixing so that the excitation purity (chroma) of an image under illumination will deteriorate. The lower grayscale range of the image in particular have a low luminance from the projection light, so they are readily affected by the illumination and the chroma deterioration is likely to be large.

As can be seen from FIGS. 10 to 15, there is an effect by which the deterioration of the lower grayscale excitation purity (chroma) can be suppressed by reducing the γ value even under illumination.

With the 300-lx illumination of FIGS. 13 to 15, the effect is increased with smaller values of γ value, in comparison with the 600-lx illumination of FIGS. 10 to 12. This is because the effect of artificial light in the additive color mixing is less with illumination of 300 lx. The deterioration of the image in the lower grayscale range due to artificial light can be improved by performing γ correction or grayscale characteristic correction in accordance with the brightness of the illumination.

Figure 16:
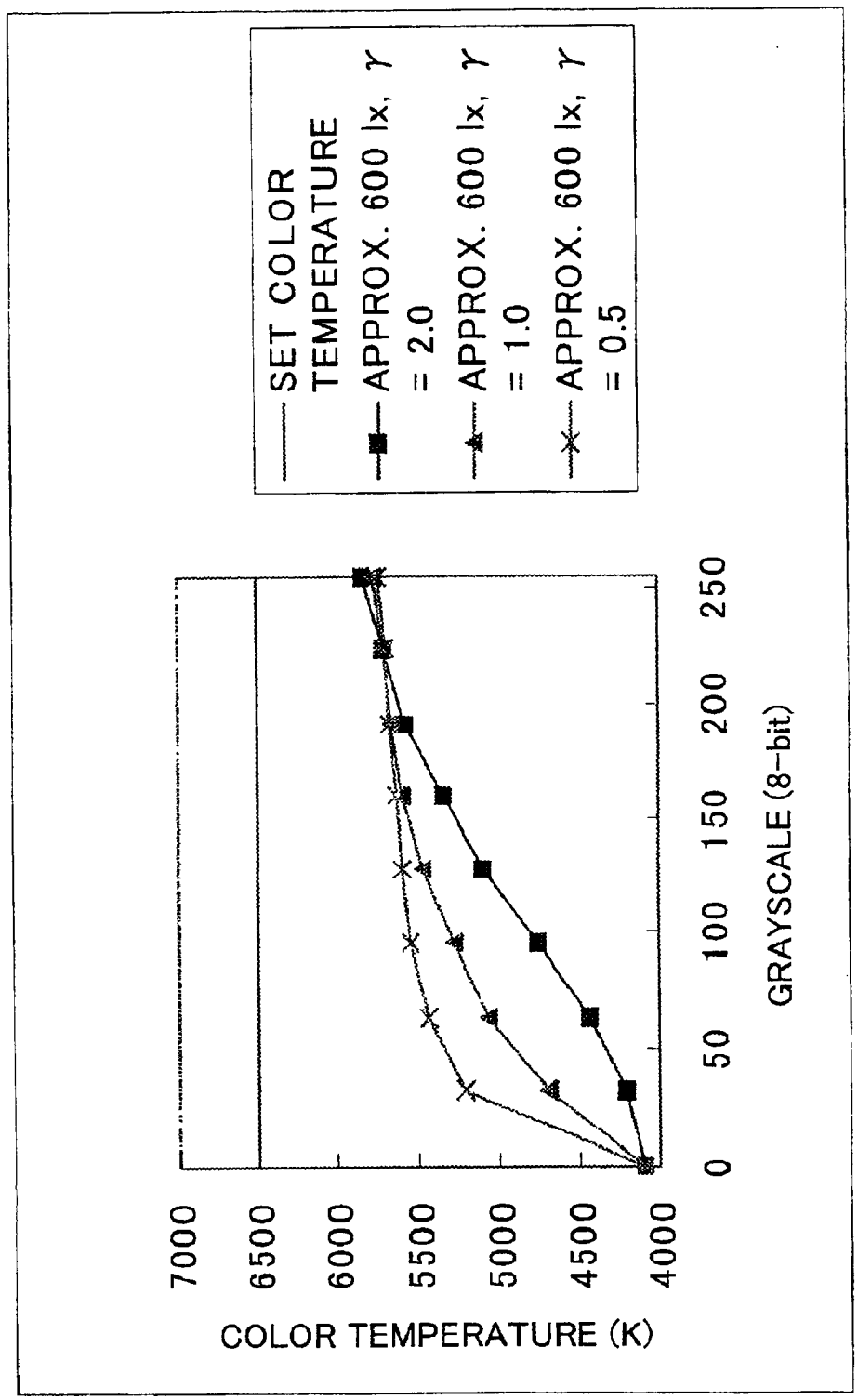
FIG. 16 shows variations in color temperature when gray level is varied, where the illuminance is approximately 600 lx and the $\gamma$ value of the projected image is 2.0, 1.0, and 0.5.
Figure 17:
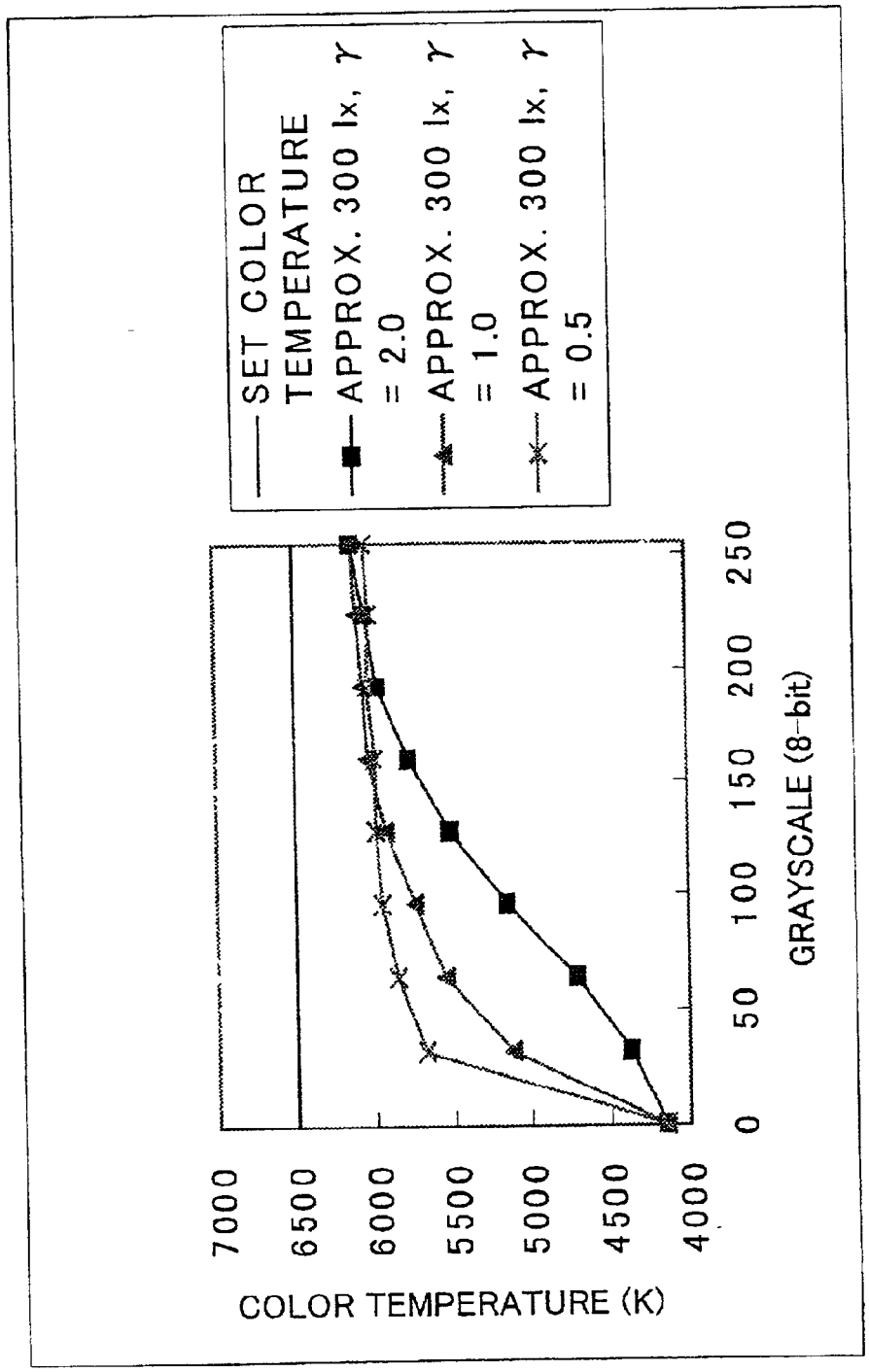
FIG. 17 shows variations in color temperature when gray level is varied, where the illuminance is approximately 300 lx and the $\gamma$ value of the projected image is 2.0, 1.0, and 0.5.

The graph of FIG. 16 shows variations in color temperature when gray level is varied, where the illuminance is approximately 600 lx and the γ value of the projected image is 2.0, 1.0, and 0.5, and the graph of FIG. 17 shows those variations when the illuminance is approximately 300 lx and the γ value of the projected image is 2.0, 1.0, and 0.5. In this case, the set color temperature of the projector 20 itself is 6500K.

As can be seen from FIGS. 16 and 17, the color temperature stabilizes regardless of gray level variations when the γ value is small, at illumination intensities of both 600 lx and 300 lx. It should be noted, however, that the level of stabilization varies with the brightness of the illumination.

This is at approximately 5500K (γ=0.5) under 600-lx illumination whereas it is approximately 6000K (γ=0.5) under 300-lx illumination. Note that the illumination used in these experiments was provided by fluorescent lamps. The color temperature of the artificial light produced by fluorescent lamps is a little more than 4000K, giving a rather yellowish light.

The quantity of artificial light that is involved in the additive color mixing varies with the brightness of the artificial light. That is to say, different quantities of yellowish light (artificial light) are added to the image, depending on the brightness of the artificial light. As a result, when an image is affected by illumination, it is considered that the level at which the color temperature of the projected image stabilizes depends on the brightness of the artificial light, as shown in FIGS. 16 and 17.

This embodiment of the present invention makes it possible to make the color temperature of the reproduced image settle at 6500K by setting the color temperature of the projection light of the projector 20 to higher than 6500K, when under the illumination of fluorescent lamps.

As can also be seen from FIGS. 16 and 17, the level at which the color temperature of the image moves changes with the brightness of the illumination, so that the setting of the color temperature of the projection light (how far above the target color temperature to set it) depends on the brightness of the illumination.

With this embodiment of the present invention, the color temperature of the image reproduced under illumination in each part of the grayscale can be stabilized and also the image can be reproduced at the target color temperature, by using γ correction to cause the color temperature of the image under illumination to stabilize at a certain level, then correcting the color temperature of the depicted image in accordance with the brightness.

Description of Hardware

Note that the various means described below could be applied as hardware to be used in the previously described components.

For example, the input signal processing section 401 could be implemented by using an A/D converter or the like, the color control processing section 420 could be implemented by using RAM or a CPU or the like, the output signal processing section 405 could be implemented by using a D/A converter or the like, the L/V drive section 406 could be implemented by using a liquid-crystal light bulb driver or the like, and the calibration section 430 could be implemented by using an image processing circuit or the like. Note that these components could be implemented by hardware such as circuitry, or by software such as drivers.

The functions of these components could also be implemented by the reading of a program from an information storage medium 500. Means such as a CD-ROM, DVD-ROM, ROM, RAM, or hard disk can be used as the information storage medium 500, and either a direct method or an indirect method could be used for reading that information.

Instead of the information storage medium 500, it is also possible to implement the above described functions by downloading a program for implementing those functions from a host device or the like, through a transfer path. In other words, information for implementing the above described functions could be embodied over carrier waves.

The present invention has been described above by way of an ideal embodiment thereof but the application of the present invention is not limited to that embodiment.

Variations

If color compression and color expansion are not performed, by way of example, the function blocks can be simplified more than in FIG. 3.

Figure 4:
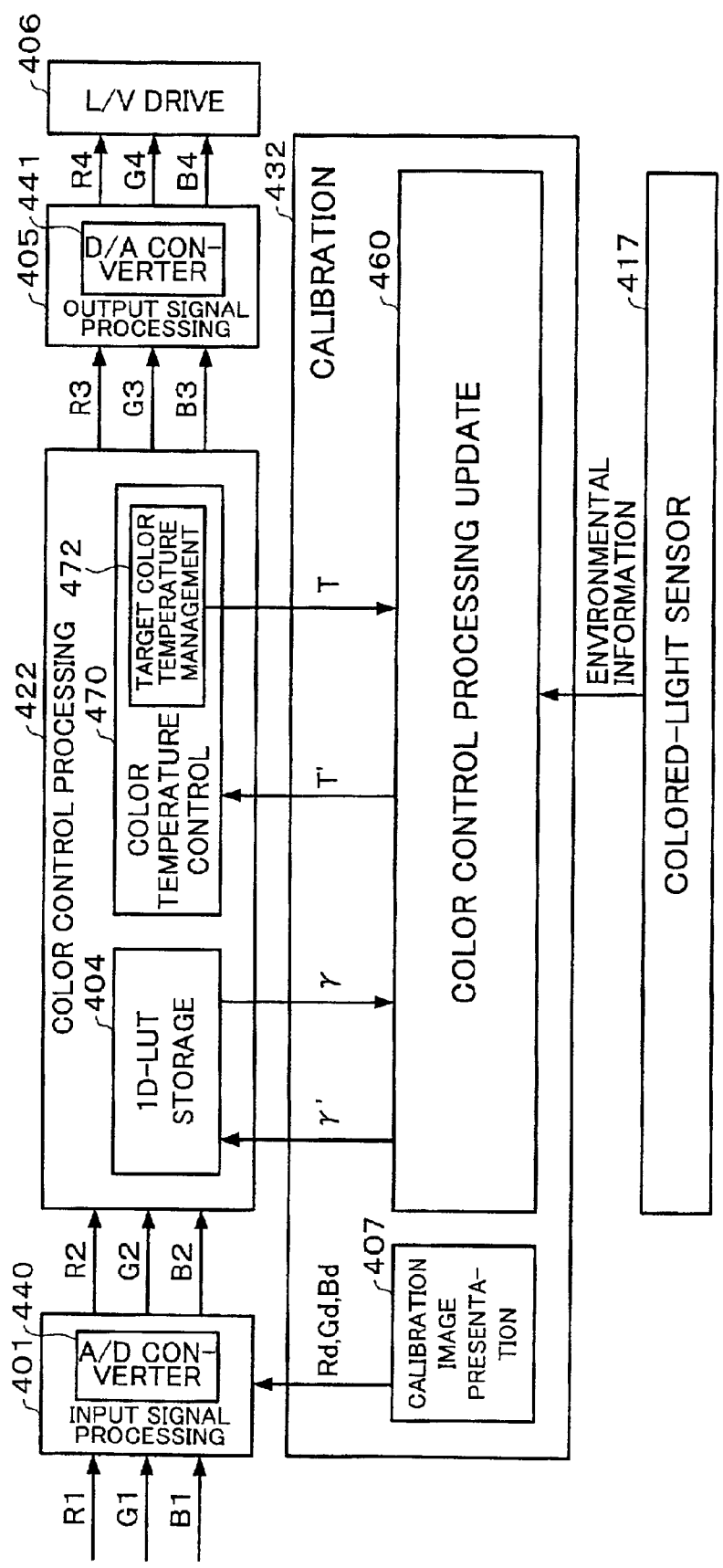
FIG. 4 is a functional block diagram of the image processing section within a projector in accordance with another example of this embodiment of the invention.

A functional block diagram of the image processing section within a projection in accordance with another example of this embodiment of the present invention is shown in FIG. 4.

This image processing section does not have the 3D-LUT storage section 403, the color conversion section 408, the 3D-LUT storage section 409, and the post-correction 3D-LUT storage section 414 of FIG. 3, but instead a color temperature control section 470 is provided in a color control processing section 422 and the target color temperature management section 472 is provided as part of the color temperature control section 470.

The color control processing update section 460 updates the target color temperature T from the target color temperature management section 472 to the target color temperature T', based on environmental information from the colored-light sensor 417, and outputs the target color temperature T' to the color temperature control section 470.

The color temperature control section 470 outputs to the output signal processing section 405 the colors of the image in such a manner as to achieve the target color temperature T' from consideration of the ambient light, as the corrected R3, G3, and B3 signals.

Note that a prior-art 1D-LUT is stored in the color temperature control section 470. In other words, the color correction is done with a 1D-LUT so that there are none of the effects achieved by the color compression and color expansion due to the previously described 3D-LUT, but the use of the color temperature control function provided in the prior art has the effect of enabling color correction without the addition of any new mechanism.

This makes it possible to configure a system that corrects for the effects of the environment in a simple manner, by providing the new 1D-LUT storage section 404 and managing a 1D-LUT for brightness correction.

In addition, suitable color reproduction can be achieved because the color temperature T is corrected in accordance with the brightness of the ambient light.

Note that the components of FIG. 3 are used for other functions so further description thereof is omitted.

In addition, the LUTs stored in the previously described 3D-LUT storage section 403 and 1D-LUT storage section 404 could provide values that are scattered, such as in a mapping table form, or they could provide continuous values, such as those derived from functions, by way of example.

Note that if values are in a dispersed form, such as in a mapping table, substantially continuous values (corresponding colors) can be obtained by interpolation using a method such as Lagrange interpolation or linear interpolation.

In the embodiment of the present invention described above, the colored-light sensor 417 was used as the visual environment detection means by way of example, but an input means that inputs at least some part of the environmental information (such as the presence/absence of external light, the illumination type, or the screen type) or an image display means that displays an image for prompting the input of such details could be used therefor. Both the colored-light sensor 417 and an image for inputting screen type could be used together.

With a screen, in particular, it is easy for people to distinguish the type of the screen easily, so it is possible to display various types of screen for selection, by way of example, to enable reproduction of colors with reference to the screen type, with little likelihood of a human decision error.

In this case, the visual environment determined by the visual environment detection means applies to factors such as ambient light (such as artificial light or natural light) and the object on which the image is displayed (such as a display, wall surface, or screen).

In particular, this embodiment of the present invention makes it possible to apply more appropriate image correction by obtaining information on a component that is not much considered in the prior art (i.e., the screen), thus enabling the reproduction of more uniform image colors.

Note that the screen 10 described above is of a reflective type, but it could equally well be of a transparent type. If the screen is of a transparent type, a sensor that scans the screen directly could be used as the colored-light sensor.

Similarly, the present invention can also be applied to presentations done by displaying images by a display means other than a projection means such as the previously described projector. Other than a liquid-crystal projector, a projector using a digital micromirror device (DMD), a cathode ray tube (CRT), a plasma display panel (PDP), a field emission display (FED) device, an electroluminescence (EL) device, or a direct-vision type of liquid crystal display device could be used as such a display means. Note that DMD is a trademark registered to Texas Instruments Inc. of the USA.

It should be obvious that the present invention would also be effective when displaying images in applications that are not presentations, such as in meetings, for medical treatment, in the design or fashion world, in business activities, and in education, as well as for general-purpose image displays such as movies, TV, video, and games.

If the input signals (R1, G1 and B1) are digital signals, the A/D converter section 440 is not necessary, and if the output signals (R6, G6 and B6) are digital signals, the D/A converter section 441 is not required. This is preferably done as necessary in accordance with the input devices and output devices that are used.

Note that the functions of the previously described image processing section of the projector 20 could be implemented by a simple image display device (such as the projector 20), or they could be implemented by being distributed between a plurality of processing devices (such as processing that is distributed between the projector 20 and a PC).

In above embodiment, information in xyY (or Yxy) form is used as color information comprising brightness information, but it could equally well be in another format such as Lab, Luv, or LCh.

The above described environmental information could also be values that express color and brightness in a form such as xyY, but it could also be color and brightness correction amounts in a form such as $\Delta x \Delta y \Delta Y$.

In addition, the embodiment described above related to application to a front-projection type of projector, but the present invention can equally well be applied to a rear-projection type of projector.

What is claimed is:

1. An environment-compliant image display system comprising:

correction means which corrects input-output characteristic data for display that is used by a means for displaying an image, the correction being in such a manner as to increase an output value in at least a lower grayscale range when the environment is affected by ambient light, based on environmental information that expresses visual environment in an area in which the image is displayed.

2. The image display system as defined in claim 1, wherein the correction means corrects the input-output characteristic data by performing a predetermined calculation using parameters that differ between a lower grayscale range and a grayscale range other than the lower grayscale range.

3. The image display system as defined in claim 1, wherein the correction means corrects the input-output characteristic data by performing a predetermined calculation based on a difference between a brightness value for actual environment which is comprised within the environmental information, and a brightness value for an ideal environment.

4. The image display system as defined in claim 1, wherein the correction means performs gamma correction as at least part of the correction of the input-output characteristic data.

5. The image display system as defined in claim 1, wherein the correction means corrects color modification information that is stored in a predetermined storing region, in such a manner that a color temperature of the image to be displayed is adjusted, based on a brightness value for the actual environment that is comprised within the environmental information.

6. The image display system as defined in claim 5, wherein the color modification information is a three-dimensional look-up table.

7. An environment-compliant image display system comprising:

a correction section which corrects input-output characteristic data for display that is used by a means for displaying an image, the correction being in such a manner as to increase an output value in at least a lower grayscale range when the environment is affected by ambient light, based on environmental information that expresses visual environment in an area in which the image is displayed.

8. A program embodied on an information storage medium or in a carrier wave, the program causing a computer to function as:

correction means for correcting input-output characteristic data for display that is used by a means for displaying an image, the correction being in such a manner as to increase an output value in at least a lower grayscale range when the environment is affected by ambient light, based on environmental information that expresses visual environment in an area in which the image is displayed.

9. The program as defined in claim 8, wherein the correction means corrects the input-output characteristic data by performing a predetermined calculation using parameters that differ between a lower grayscale range and a grayscale range other than the lower grayscale range.

10. The program as defined in claim 8, wherein the correction means corrects the input-output characteristic data by performing a predetermined calculation based on a difference between a brightness value for actual environment which is comprised within the environmental information, and a brightness value for an ideal environment.

11. The program as defined in claim 8, wherein the correction means performs gamma correction as at least part of the correction of the input-output characteristic data.

12. The program as defined in claim 8, wherein the correction means corrects color modification information that is stored in a predetermined storing region, in such a manner that a color temperature of the image to be displayed is adjusted, based on a brightness value for the actual environment that is comprised within the environmental information.

13. The program as defined in claim 12, wherein the color modification information is a three-dimensional look-up table.

* * * * *